J. R. HAMILTON.
EMERGENCY SHUT-OFF DEVICE FOR CHEMICAL EXTINGUISHING APPARATUS.
APPLICATION FILED AUG. 5, 1915.

1,298,203.

Patented Mar. 25, 1919.

INVENTOR
John R Hamilton
BY
Harry L Duncan ATTORNEY

UNITED STATES PATENT OFFICE.

JOHN R. HAMILTON, OF YONKERS, NEW YORK, ASSIGNOR TO SYPHO-CHEMICAL SPRINKLER CORPORATION, OF CROTON-ON-HUDSON, NEW YORK, A CORPORATION OF NEW YORK.

EMERGENCY SHUT-OFF DEVICE FOR CHEMICAL EXTINGUISHING APPARATUS.

1,298,203.      Specification of Letters Patent.      Patented Mar. 25, 1919.

Application filed August 5, 1915. Serial No. 43,715.

*To all whom it may concern:*

Be it known that I, JOHN R. HAMILTON, a citizen of the United States, residing at Yonkers, Westchester county, State of New York, have made a certain new and useful Invention Relating to Emergency Shut-Off Devices for Chemical Extinguishing Apparatus, of which the following is a description, taken in connection with the accompanying drawing.

This invention relates especially to shut-off devices for chemical fire extinguishing systems comprising a distributing system and chemical mixing tank connected therewith through a cut-off or check valve which automatically opens under emergency conditions. A suitable manual closer device may be arranged in connection with this valve to close it after the fire has been extinguished to prevent subsequent water damage and an automatic locking device is arranged in connection with this closer so as to prevent the inadvertent positive closing of the valve except under the emergency condition of the system.

In the accompanying drawing showing in a somewhat diagrammatic way illustrative embodiments of this invention, Figure 1 is a vertical section through one form of apparatus; and Fig. 2 is a similar view showing another form.

The distributing system may be of any desired construction and arrangement and may as indicated be normally charged with non-freezing or other extinguishing liquid and comprise one or more risers or supply pipes 3 to which may be connected various distributing lines 5 on which automatic or other distributing devices such as the automatic sprinkler head 7 may be arranged at various points around the building to be protected. The riser or supply pipe 3 may be connected with the chemical supply tank 1 or supply of extinguishing liquid in any suitable way and may as indicated have the lower end of this supply connection 65 extend a considerable distance into the carbonate or other extinguishing liquid 2 in this tank so as to have its lower end adjacent the bottom of the tank as is usual in these devices. If desired also a suitable cut-off or check valve may be provided at any desired place in this supply connection and may be conveniently mounted in the valve casing or chamber 45 adjacent the tank to which the riser may be connected as indicated. This casing may be formed with the valve seat 48 with which may coöperate the supply cut-off or check valve 47 which may have considerable weight to give the desired closing action. This valve may be mounted on the valve stem 50 extending through suitable guides or bearings, such as 49, 64, secured to the casing and when released under normal conditions as shown in Fig. 1 this valve is free to rise on the increased pressure or flow of extinguishing liquid from the supply tank so as to allow this liquid to pass into the riser or supply pipe above and effect the desired high pressure emergency discharge from the distributing devices in operation.

It is also desirable to have an automatically closing venting drain device in the supply connection which is normally open for venting purposes and to drain off any slight leakage that may occur from the distributing system, it being desirable to have this venting device automatically close under emergency conditions to minimize further escape of fluid therefrom. For this purpose the venting drain device or hole 60 may be formed in the valve casing, for example, so as to provide a normally open drain or vent through which may escape any slight leakage of liquid from the distributing system which is preferably prevented from entering the chemical supply tank by the position or shape of the parts, as for instance the upwardly flaring deflecting flange 63 which may project into the chamber 52 so as to minimize the possibility of any liquid from the distributing system entering the connections or pipe 62, 65 below. The depending drip flange 87 may also, if desired, be formed adjacent to the aperture or valve seat 48 so as to guide any escaping liquid toward this drain aperture 60. An automatically closing valve of any suitable character may be provided in connection with this drain aperture 60, the valve 59 being shown in Fig. 1 as pivoted about the pin 58 and having any suitably connected actuating lever 57 coöperating with a suitable projection or collar 51 on the valve stem 50 so that when this valve is in its normal closed position the vent valve may be raised so that the vent is in its normal open condition. When, however, the cut-off or check valve 47 is raised by the emergency flow of liquid from the tank under emergency conditions the raising of this valve and connected stem will as appreciated on consideration of Fig. 1 allow the vent valve on the lever 59 to descend and by its weight close the vent and prevent further discharge therefrom. It is also desirable in some cases to provide a suitable closer coöperating with this cut-off valve 47 to positively and tightly shut it, for instance, when it is desirable to recharge the system after its emergency operation. This may be effected by the illustrative closing device shown in the drawings which may comprise the closer lever 53 pivoted about the pin 56 and having its divided or yoke end 54 brought into engagement with the collar 51 by any suitable devices, such, for example, as the closer stem 74 which may have a pin and slot connection 55 with the lever. This stem may be carried out through a suitable packing or stuffing box 76 of any suitable construction within the open frame or casing 75 which may support the nut 72 having a threaded portion engaging the threaded end 73 of this stem. This nut may be operated by the hand wheel 77 splined to the nut in any desired way and firmly held thereon by the lock nut 78 so that by operating the hand wheel this nut is rotated and the stem forcibly moved in a longitudinal direction so as to force the end 54 of the closer lever down into the closed position shown in Fig. 1 in which the valve 47 is positively and tightly closed. It is usually desirable to have the vent closed under these conditions and the closer may be arranged to effect the simultaneous closing of the check valve and vent as by positive connections or operating devices on the closer. For this purpose the closer lever may be provided with the extension 93 engaging the actuating arm 94 on the vent lever 59 so as to swing this valve downward and positively close the vent 60 when the closer lever is depressed. With this arrangement the actuating lever 57 is preferably a separate member distinct from the vent lever 59 though pivoted about the same pin 58 and connected by the light spring 96 normally drawing the two together as far as the alining stud or lug 95 allows. Thus the vent valve lever 59 and its actuating lever 57 normally act as a unit but are spring connected so that when the closer operates the two may swing apart as indicated in Fig. 2.

In order to prevent ignorant or unauthorized persons tampering with this device an automatic locking arrangement may be provided comprising a ratchet or locking wheel 71 connected with the nut 72, and the closer locking device or pawl 70 coöperating with this ratchet and mounted on the rod 69 preferably having its lower end also inclosed to prevent tampering therewith and connected by the pin 68 with the locking diaphragm 67. This diaphragm may be mounted in a suitable diaphragm chamber or casing 66 connected by the pipe or connection 61 with the chamber 52 so that under normal conditions when the vent 60 is open the weight of the diaphragm and connected parts keep them in the lower position shown in Fig. 1. Under emergency conditions, however, when the pressure increases in this chamber the increased pressure on the lower side of the diaphragm 67 raises the locking pawl 70 and releases it from the locking ratchet 71 on the closer device so that this closer may then be operated to close the check valve 47 in connection with the recharging or repair of the apparatus, or to shut off the continued discharge from the system after the fire is extinguished, it being understood that the cap screw 46 may be removed to give access to the valve and provide an opening preferably of ample size so as to allow its removal from the casing for repair, assembly or other purpose.

In the form of apparatus shown in Fig. 2 the supply pipe 3 may be connected to the valve casing 145 in which may be mounted a suitable check or cut-off valve 147 coöperating with the seat 48 and connected to the stem 150 which is mounted in suitable bearings or guides such as 164, to guide the valve during its vertical movement. The valve stem may be provided in this instance with a suitable slot 13 with which coöperates the operating end or projecting portion 12 of the closer lever 10 which may be pivoted about the pin 11 in the casing and positively actuated by a coöperating manual closer device such as the closer stem 174 having a pin 55 coöperating with the slot 20 in the closer lever and extending through a stuffing box 176 in the valve casing. A similar operating wheel 77 may have a connected nut 72 revolubly mounted in the bracket 75 and coöperating with the threaded end 73 of this closer stem so as to positively move the closer stem inward and thus force its operating end 12 downward so as to positively draw downward the cut-off valve 147 and hold it in the closed position indicated in Fig. 2 so as to prevent its further upward movement.

A suitable automatic closer locking device is also preferably provided in this instance and may comprise the closer locking ratchet 71 secured to or integral with the nut 72 and having a closer locking device or pivoted pawl 23 normally held in coöperation therewith so that under inoperative conditions of the sprinkler system it is impossible to rotate this hand wheel 77 in such direction as to depress the closer. A locking diaphragm such as 167 may be provided and connected by the link 24 pivoted thereto by the pin 68 and pivoted at its upper end to the locking pawl 23 so that under normal conditions this diaphragm is held in its lower full line position indicated so as to prevent such movement of the closer device, all the parts being preferably protected by being inclosed in a suitable protective casing 124. The diaphragm chamber 166 is, however, connected to any convenient part of the system which is exposed to the emergency pressure therein which may be effected by the pressure connection or pipe 4 leading to the mixing tank 1 so that under emergency conditions the high pressure forces this resilient diaphragm 167 upward and thus withdraws the pivoted locking device from the ratchet and allows the manual closing of the cut-off valve at any time so long as the emergency pressure continues. A convenient arrangement of the coöperating venting drain device or hole 60 and its coöperating closing valve and devices may comprise a valve 19 coöperating with the drain hole and pivoted to the drain valve lever 26 which may have a loose pin and slot connection with the valve or stem and also with the closer lever. For instance the pin 15 on the end of this drain lever may coöperate with the slot 14 in the valve stem and the lever may have a slot 18 with which a pin, such as 17, in the closer lever may coöperate. By this arrangement under the normal inactive condition of the system the cut-off valve 47 in its closed position raises the valve 19 at the other end of this drain lever, but since the cut-off valve 47 rises when the system comes into emergency operation the drain lever can swing about the pin 17 so that the drain valve 19 descends to close the venting hole 60 and prevent any undesirable escape of liquid therefrom. By this arrangement also the closer lever when it swings downward to positively close and hold the cut-off valve in closed position also keeps the drain device closed, since the pin 17 in the closer lever swings along the slot 18 in such way as to keep the drain valve closed while the main cut-off valve is being forced downward, the slot 14 in the valve stem being of such length as to allow this action without permitting the drain valve connections to interfere with the positive closure of the cut-off valve. If desired, also a suitable pressure gage or indicator 22 may be connected with the casing 145 as by the pipe 21 so that the operator can observe the pressure conditions in the system when manually shutting it off and be governed accordingly.

This invention has been described in connection with a number of illustrative embodiments, forms, arrangements, materials, proportions, sizes and parts of the apparatus, to the details of which disclosure the invention is not of course to be limited, since what is claimed as new and what is desired to be secured by Letters Patent is set forth in the appended claims.

1. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve having a valve stem mounted in guides and provided with a venting drain device located between said check valve and said supply, a drain valve coöperating with said drain device and loosely connected with said valve stem, a manual valve closer comprising an operating wheel and nut and a threaded closer stem with which said nut coöperates, a closer lever pivoted in said casing and having a loose connection with said closer stem and having an operating end loosely coöperating with said valve stem, said closer lever having a loose connection with said drain valve to normally hold said drain valve open when said closer is in inoperative position and when said cut-off valve is closed and to effect the shutting of said drain valve when said closer positively holds said cut-off valve shut or when said cut-off valve automatically opens, an automatic locking device coöperating with said closer and comprising a locking ratchet device connected to said wheel and a coöperating inclosed locking pawl, a connected resilient diaphragm normally holding said locking device in operative position and means by which the emergency pressure in said supply can move said diaphragm and release said locking device to allow the manual closure of said shut-off valve under emergency conditions.

2. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve having a valve-stem and provided with a venting drain device located between said check valve and said supply, a drain valve coöperating with said drain device and loosely connected with said valve stem, a manual closer comprising a nut and a closer stem with which said nut coöperates, a closer lever pivoted in said casing and having a loose connection with said closer stem and having an operating end loosely coöperating with said valve stem, said closer lever having a loose connection with said drain valve to normally hold said drain valve open when said closer is in inoperative position and when said cut-off valve is closed and to effect the shutting of said drain valve when said closer positively holds said cut-off valve shut or when said cut-off valve automatically opens, an automatic locking device coöperating with said closer and comprising a locking ratchet device and a coöperating inclosed locking pawl, a connected resilient diaphragm normally holding said locking device in operative position and means by which the emergency pressure in said supply can move said diaphragm and release said locking device to allow the manual closure of said shut-off valve under emergency conditions.

3. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve having a valve stem and provided with a venting drain device located between said check valve and said supply, a drain valve coöperating with said drain device and loosely connected with said valve stem, a manual valve closer comprising a nut and a closer stem with which said nut coöperates, a closer lever pivoted in said casing and having a loose connection with said closer stem and having an operating end loosely coöperating with said valve stem, said closer lever having a loose connection with said drain valve to normally hold said drain valve open when said closer is in inoperative position and when said cut-off valve is closed and to effect the shutting of said drain valve when said closer positively holds said cut-off valve shut or when said cut-off valve automatically opens, an automatic locking device coöperating with said closer and a connected resilient diaphragm normally holding said locking device in operative position and means by which the emergency pressure in said supply can move said diaphragm and release said locking device to allow the manual closure of said shut-off valve under emergency conditions.

4. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve, a manual valve closer comprising an operative wheel and nut and a threaded closer stem with which said nut coöperates, a closer lever pivoted in said casing and having a loose connection with said stem and having an operating end loosely coöperating with said valve, an automatic locking device coöperating with said closer and comprising a locking ratchet connected to said wheel and a coöperating inclosed locking pawl, a connected resilient diaphragm normally holding said locking device in operative position and means by which the emergency pressure in said supply to move said diaphragm and release said locking device to allow the manual closure of said shut-off valve under emergency conditions.

5. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve, a manual valve closer comprising a closer lever pivoted in said casing and having an operating end loosely coöperating with said valve, an automatic locking device coöperating with said closer and a connected resilient diaphragm normally holding said locking device in operative position and means by which the emergency pressure in said supply can move said diaphragm and release said locking device to allow the manual closure of said shut-off valve under emergency conditions.

6. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve, a manual valve closer comprising a closer lever pivoted in said casing and having an operating end loosely coöperating with said valve, an automatic locking device coöperating with said closer and a connected pressure responsive member normally holding said locking device in operative position and means by which the emergency pressure in said supply can move said member and release said locking device to allow the manual closure of said shut-off valve under emergency conditions.

7. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve having a valve stem mounted in guides and provided with a venting drain device located between said check valve and said supply, a drain valve coöperating with said drain device, a drain lever connected to said drain valve and having a pin and slot connection with said check valve stem, a manual valve closer comprising an operating wheel and nut and a threaded closer stem with which said nut coöperates, a closer lever pivoted in said casing and having a loose connection with said closer stem and having an operating end loosely coöperating with a slot in said check valve stem, said closer lever having a pin and slot connection with said drain lever to normally hold said drain valve open when said closer is in inoperative position and when said cut-off valve is closed and to effect the shutting of said drain valve when said closer positively holds said cut-off valve shut or when said cut-off valve automatically opens.

8. In fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve having a valve stem and provided with a venting drain device located between said check valve and said supply, a drain valve coöperating with said drain device, a drain lever connected to said drain valve and having a pin and slot connection with said check valve stem, a manual valve closer comprising a closer lever pivoted in said casing and having an operating end loosely coöperating with a slot in said check valve stem, said closer lever having a pin and slot connection with said drain lever to normally hold said drain valve open when said closer is in operative position and when said cut-off valve is closed and to effect the shutting of said drain valve when said closer positively holds said cut-off valve shut or when said cut-off valve automatically opens.

9. In a fire extinguishing apparatus, a wet pipe distributing system, a supplemental supply of extinguishing liquid for said system comprising a chemical mixing tank, a supply connection between said supplemental supply and said distributing system comprising a valve casing provided with a normally closed cut-off check valve and provided with a venting drain device located between said check valve and said supply, a drain valve coöperating with said drain device, a drain lever connected to said drain valve and having a pin and slot connection with said check valve, a manual valve closer comprising a closer lever pivoted in said casing and having an operating end loosely coöperating with said check valve, said closer lever having a pin and slot connection with said drain lever to normally hold said drain valve open when said closer is in inoperative position and when said cut-off valve is closed and to effect the shutting of said drain valve when said closer positively holds said cut-off valve shut or when said cut-off valve automatically opens.

10. In fire extinguishing apparatus, a wet pipe distributing system, a chemical pressure tank, a supply connection between said tank and distributing system and provided with a normally closed cut-off check valve and with a normally open venting drain device located between said check valve and said tank and automatically closed when said check valve opens on the emergency operation of the system, a manually operated valve closer coöperating with said check valve to force the same into closed position and to simultaneously effect the closure of said venting device and a coöperating locking device normally locking said closer against movement and pressure operated means automatically releasing said locking device when said system is under emergency pressure.

11. In fire extinguishing apparatus, a wet pipe distributing system, a chemical pressure tank, a supply connection between said tank and distributing system and provided with a normally closed cut-off valve and with a normally open venting drain device located between said valve and said tank and automatically closed when said valve opens on the emergency operation of the system, a manually operated valve closer coöperating with said valve to force the same into closed position and to simultaneously effect the closure of said venting device and a coöperating locking device normally locking said closer against movement and pressure operated means automatically releasing said locking device when said system is under emergency pressure.

12. In fire extinguishing apparatus, a wet pipe distributing system, a chemical pressure tank, a supply connection between said tank and distributing system and provided with a normally closed cut-off valve and with a normally open venting drain device located between said valve and said tank and automatically closed when said valve opens on the emergency operation of the system, a manually operated valve closer coöperating with said valve to force the same into closed position and to simultaneously effect the closure of said venting device and a coöperating locking device normally locking said closer against movement.

13. In fire extinguishing apparatus, a wet pipe distributing system, a chemical pressure tank, a supply connection between said tank and distributing system and provided with a normally closed cut-off valve and with a normally open venting drain device located between said valve and said tank and automatically closed when said valve opens on the emergency operation of the system, a manually operated valve closer coöperating with said valve to force the same into closed position and a coöperating locking device normally locking said closer against movement.

14. In fire extinguishing apparatus, a wet pipe distributing system, a gaseous pressure tank, a supply connection between said tank and distributing system and provided with a normally closed cut-off check valve and with a normally open venting drain device located between said check valve and said tank and automatically closed when said check valve opens on the emergency operation of the system, a manually operated valve closer coöperating with said check valve to force the same into closed position to simultaneously effect the closure of said venting device.

15. In fire extinguishing apparatus, a wet pipe distributing system, a gaseous pressure tank, a supply connection between said tank and distributing system and provided with a normally closed cut-off valve and with a normally open venting drain device located between said valve and said tank and automatically closed when said valve opens on the emergency operation of the system, and a manually operated valve closer coöperating with said valve to force the same into closed position.

16. In fire extinguishing apparatus, a wet pipe distributing system, a chemical pressure tank, a supply connection between said tank and distributing system and provided with a normally closed check valve and with a normally open venting drain device located between said check valve and said tank and connections between said check valve and said drain device by which said drain device is automatically closed when said check valve opens on the emergency operation of the system.

17. In fire extinguishing apparatus, a wet pipe distributing system, a chemical pressure tank, a supply connection between said tank and distributing system and provided with a check valve and with a normally open venting drain device located between said check valve and said tank and connections between said check valve and said drain device by which said drain device is automatically closed when said check valve opens on the emergency operation of the system and a manually operated valve closer coöperating with said check valve to force the same into closed position.

18. In fire extinguishing apparatus, a wet pipe distributing system, a chemical pressure tank, a supply connection between said tank and distributing system and provided with a check valve and with a normally open venting drain device located between said check valve and said tank and means by which said drain device is automatically closed when said check valve opens on the emergency operation of the system.

JOHN R. HAMILTON.

Witnesses:
HARRY L. DUNCAN,
JESSIE B. KAY.

Copies of this patent may be obtained for five cents each, by addressing the "Commissioner of Patents, Washington, D. C."